July 3, 1951 W. MURRAY 2,559,223
SLIDING CLAMP
Filed Nov. 9, 1948 2 Sheets-Sheet 1
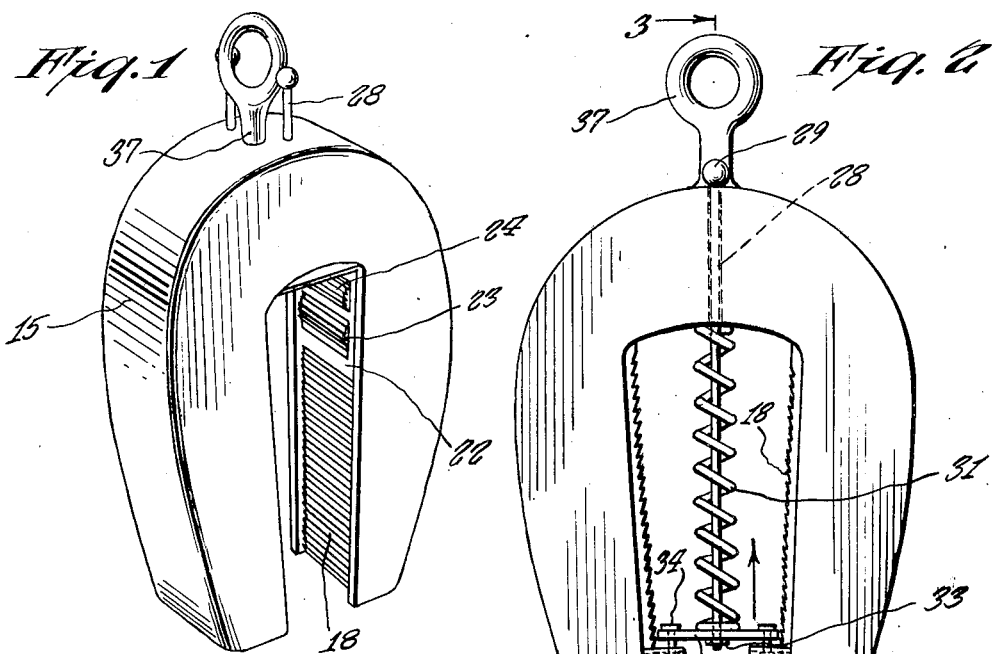
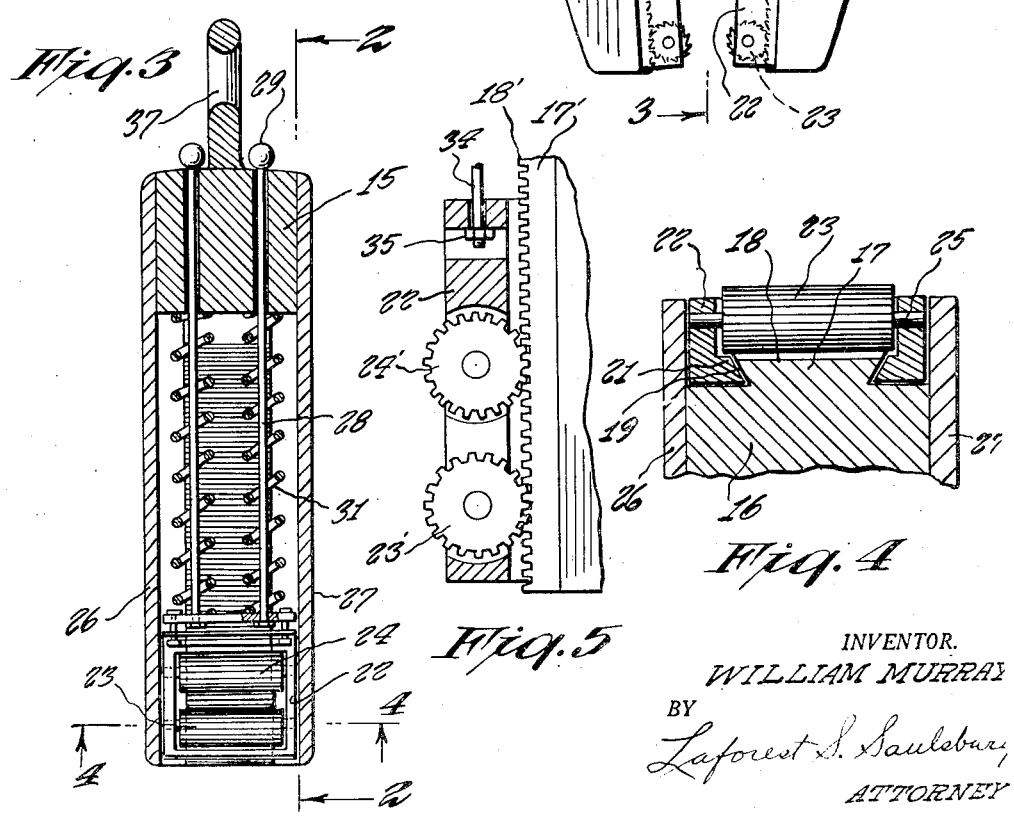
INVENTOR.
WILLIAM MURRAY
BY
Laforest S. Saulsbury
ATTORNEY July 3, 1951 W. MURRAY 2,559,223
SLIDING CLAMP
Filed Nov. 9, 1948 2 Sheets-Sheet 2
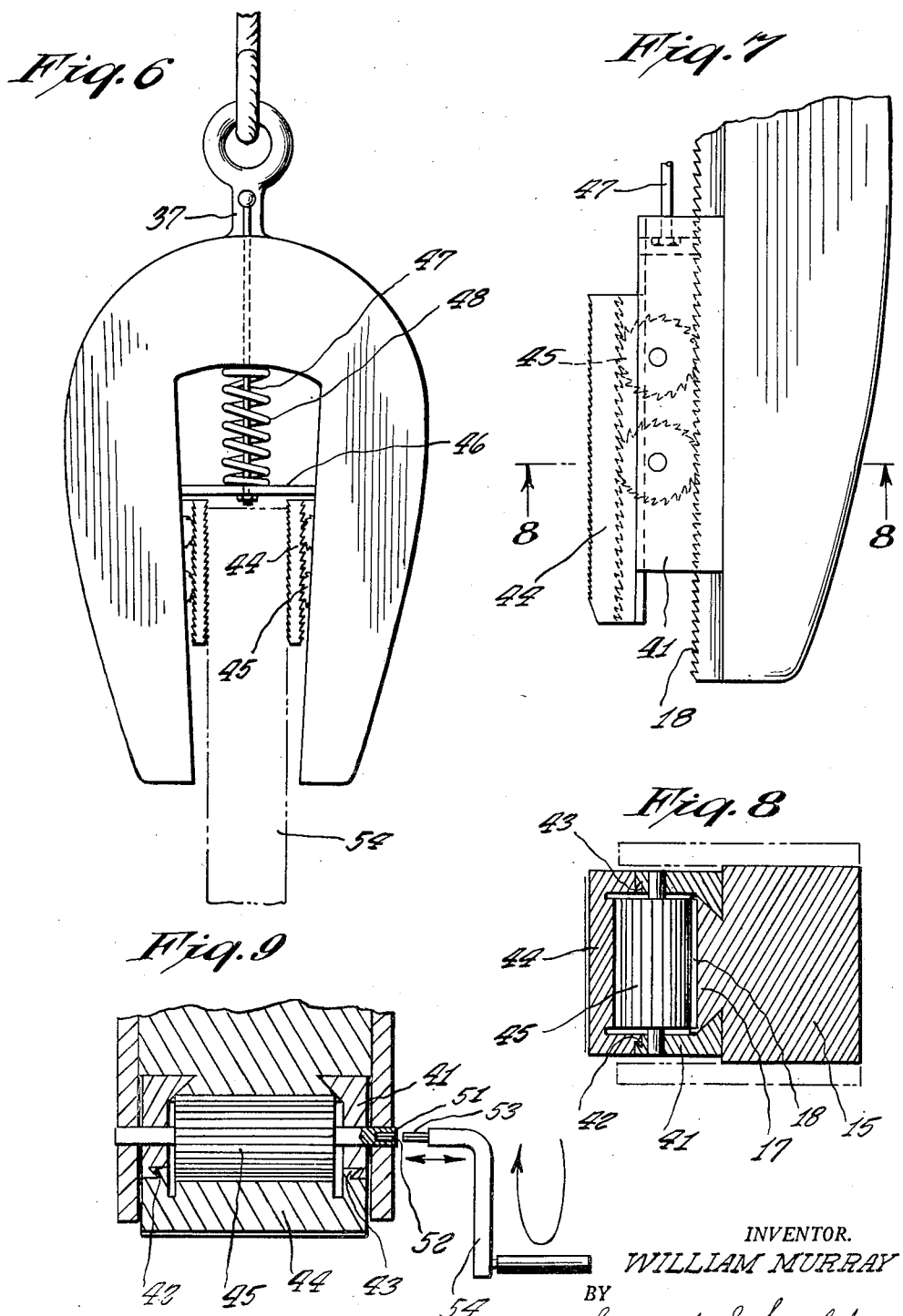
INVENTOR.
WILLIAM MURRAY
BY
Laforest S. Saulsbury
ATTORNEY Patented July 3, 1951

2,559,223

UNITED STATES PATENT OFFICE 2,559,223

SLIDING CLAMP

William Murray, Jackson Heights, N. Y.

Application November 9, 1948, Serial No. 59,099

6 Claims. (Cl. 294—86)

This invention relates to a slidable clamp gripping device or grapple.

It is an object of the present invention to provide a slide clamp gripping device or grapple which is adapted to engage sheet metal plates or cable with equal facility and wherein the sliding clamps are positively moved along the inclined surfaces when moved downwardly and wherein roughened or gear connections are effected between the slides and the inclined surfaces, the gears or a slide operated by the same engaging with the side faces of the sheet material or cable to be lifted by the gripping device or grapple.

It is another object of the present invention to provide in a gripping device or grapple employing slides movable along inclined surfaces opposite to one another, a simple release device which is workable upon both slides simultaneously to adjust and move them in unison over the opposed slide surfaces.

Other objects of the present invention are to provide a sliding clamp gripping device or grapple having positively operated slides and gears for operating the same, which is of simple construction, inexpensive to manufacture, compact and sturdy, convenient to use, easy to release, and efficient in operation.

For other objects and for a better understanding of the invention, reference may be had to the following detailed description taken in connection with the accompanying drawing, in which Fig. 1 is a perspective view of the slide clamp gripping device embodying the features of the present invention and constructed according to one form thereof.

Fig. 2 is an enlarged side elevational view of my gripping device with the slides adjusted to the down position, the side plate being removed and the view being on line 2—2 of Fig. 3.

Fig. 3 is a vertical sectional view taken on line 3—3 of Fig. 2.

Fig. 4 is an enlarged fragmentary and transverse sectional view taken on line 4—4 of Fig. 3.

Fig. 5 is a fragmentary and sectional view of a modified form of the invention wherein the inclined slide face and the rollers employ standard gear teeth instead of a ratchet type teeth as employed with the form of the invention shown in Figs. 1 to 4.

Fig. 6 is a side elevational view of a still further form of the invention wherein a top engaging plate slidable upon the slide is employed for engagement with the material and this plate being worked by the gears on the slide.

Fig. 7 is an enlarged fragmentary and side elevational view of the composite slide, the side plate being removed.

Fig. 8 is a transverse sectional view taken on line 8—8 of Fig. 7.

Fig. 9 is a transverse sectional view of a still further form of the invention wherein provision is made on the shaft extensions of the gears for receiving a hand crank which can be used at times when the slides are difficult to move or frozen to the material.

Referring now particularly to Figs. 1 to 4, 15 represents the main body of U shape having depending sides and a top portion. The sides are indicated at 16 and are provided with inclined opposed inner surfaces 17 having teeth formations 18 thereon. The surfaces 17 have dovetail side grooves 19 for receiving inwardly projected side portions 21 of a slide 22. The slide 22 is accordingly held against lateral displacement from the slide surfaces 17 on side member 16.

The slide 22 is of the closed frame type and carries two geared spaced rollers 23 and 24 having ratchet type gear teeth thereon matching with the gear teeth 18 of the slide surfaces 17. The gear teeth of the rollers 23 and 24 project inwardly from the inner face of the slide to engage with the material which is extended between the two slides and upon the grapple being elevated and the slides drawn downwardly with the material. Each roller has shaft extensions at the opposite ends of the same as indicated at 25, which are journalled in the sides of the slide frame. Fixed to the opposite sides of the main body 15 are respectively U-shaped side plates 26 and 27. These plates can be secured by screw fastening means or by welding.

Slidable respectively through openings in the top portion of the main body 15 are respectively release rods 28 having top enlargements 29. Each of these rods has a spring 31 thereon and a transverse supporting plate 32 which is made secure to the lower end of the rod by a nut 33. The supporting plate 32 has, at its opposite ends respectively, depending elements 34 extending into the slide frames 22 and made secure therewith by nuts 35, Fig. 5. When the rods 28 are in the position shown in Fig. 2, the slides 22 will be suspended from the same, the enlargement 29 engaging with the top of the main body portion. The support 32 has elongated openings 36 for receiving the respective depending elements 34 in order to allow the slides 22 to accommodate themselves upon the support bar 32.

When the grapple is connected with the sheet material or cable, the slides 22 will lie on the surfaces 17 at different positions depending upon the width of the sheet material disposed between them. When it is desired to release the slides from the material, the rods 28 can be pulled by their enlargements upwardly and out of engagement with the sides of the sheet material or cable. On release of the rods, the springs 31 will turn the slides to the down position. At all times, the movements of the slides are effected in an equalized manner and are moved in unison in a positive manner with the gears 23 and 24 working over the gear formations 18 of the slide surfaces 17. The teeth 18 of the slide surfaces 17 are shaped to cooperate with the ratchet type teeth of the gears 23 and 24 of the slide 22. Upon the upper portion of the body 15 is an eye projection 37 through which a rope or cable is extended to support the grapple and the material connected to it.

In Fig. 5, there is shown a form of the invention wherein the teeth are of standard gear shape, both on the slide surfaces 17', as indicated at 18', and on gears 24' and 23'. The teeth of the gears 23' and 24' will engage directly with the side of the sheet material to grip the same against downward displacement. The material surface will be depressed by the teeth of the gear rollers and their rotation will be effected over the gear teeth 18' until the sheet material has been sufficiently engaged by the grapple.

Referring now particularly to Figs. 6, 7 and 8, there is shown another form of the invention wherein a slide 41 is provided with side grooves 42 on its inner face to which are slidably connected projections 43 of an engaging member 44 which is adjusted and extended by gear rollers 45 as the slide is moved over geared surface 18 of slide face 17 of main body 15. The face of the contact engaging member 44 has serrations to effect a good gripping action upon the surface of the sheet material. With this arrangement, the member 44 will be positively advanced as the slide 41 is operated over the teeth 18. The slides 41 are connected together at their upper ends by a support bar 46. The bar 46 is connected to a release rod 47 having a spring 48 thereon tending to keep the slides in the down position, but adapted to be compressed when the rod is pulled upwardly to release the sheet material from the grapple.

In Fig. 9, a shaft extension 51 is provided with a squared opening 52 into which a squared projection 53 of a crank 54 may be extended in order to positively cause the rotation of the geared roller whereby to effect the disengagement of the engaging member 44 with the sheet material. In Fig. 6, the sheet material is indicated with dot and dash lines at 54'. This is particularly useful where the teeth have become set into the material. The crank can be removed after the operation has been effected and made free of the grapple.

It should be apparent that there has been provided a grapple arrangement whereby the slide is positively actuated upon the slide surfaces by the gear teeth of the rollers on the slide which contact with gear teeth on the sliding surface and wherein the same gear teeth of the rollers on the slide can serve to operate a contact or engaging member or element 44.

While various changes may be made in the detail construction, it shall be understood that such changes shall be within the spirit and scope of the present invention as defined by the appended claims.

What is claimed is:

1. A slide clamp gripping device or grapple comprising a main body having opposing side portions with inclined slide surfaces thereon, said slide surfaces having teeth extending thereacross, a slide clamp operable over each of the side portions of the main body, rollers having cooperating gear teeth thereon engaging with the gear teeth of the side portions and journalled respectively in the slide clamps, a supporting bar connecting the slide clamps together, a release rod extending upwardly from the supporting bar and through the body adapted to pull upwardly together the slide clamps on the respective inclined side portions, said release rod having a stop handle on the upper end thereof to limit the downward displacement of the slide clamps and a spring extending between the supporting bar and the main body to urge the clamps downward.

2. A slide clamp gripping device or grapple comprising a main body of U shape having depending side portions with slide surfaces thereon, said slide surfaces having teeth serrations thereon and guide slots, a slide clamp operable over the side portions of the main body, rollers having cooperating gear teeth thereon engaging with the gear teeth of the side portions and journalled respectively in the slide clamps, a supporting bar connecting the slide clamps together, a release rod extending upwardly from the supporting bar adapted to pull upwardly together the slide clamps on the respective inclined side portions, and a work engaging element slidably connected with each slide and having gear formations thereon, said rollers on the slide engaging with the gear formations of the work engaging member whereby to adjust the same over the slide as the slide is moved along the slide surfaces of the side portions of the main member.

3. A slide clamp gripping device or grapple comprising a main body of U shape having depending side portions with slide surfaces thereon, said slide surfaces having teeth serrations thereon and guide slots, a slide clamp operable over the side portions of the main body, rollers having cooperating gear teeth thereon engaging with the gear teeth of the side portions and journalled respectively in the slide clamps, a supporting bar connecting the slide clamps together, a release rod extending upwardly from the supporting bar adapted to pull upwardly together the slide clamps on the respective inclined side portions, and a work engaging element slidably connected with each slide and having gear formations thereon, said rollers on the slide engaging with the gear formations of the work engaging member whereby to adjust the same over the slide as the slide is moved along the slide surfaces of the side portions of the main member, and the roller of at least one of the slides having a shaft extension thereon accessible from the exterior of the grapple, and having a tool socket therein adapted to receive a tool for the purpose of effecting the rotation of the roller.

4. A slide clamp gripping device comprising a main body having side portions, one of the slide portions having an inclined surface thereon, said slide surface having teeth extending thereacross, a slide clamp operable over the side portion, a roller having teeth engageable with the teeth of the side portion and the slide surface thereof, said roller being journalled in the slide clamp, a work-engaging element slidably connected to the slide clamp and having teeth formations thereon, said roller engageable with the teeth formations of the work-engaging member to adjust the same relative to the slide clamp and in the reverse direction of the movement of the slide clamp, said side portions opposing each other and the other side portion having means thereon for engaging the opposite face of the work piece.

5. A slide clamp gripping device comprising a main body having side portions, one of the slide portions having an inclined surface thereon, said slide surface having teeth extending thereacross, a slide clamp operable over the side portion, a roller having teeth engageable with the teeth of the side portion and the slide surface thereof, said roller being journalled in the slide clamp, a work-engaging element slidably connected to the slide clamp and having teeth formations thereon, said roller engageable with the teeth formations of the work-engaging member to adjust the same relative to the slide clamp and in the reverse direction of the movement of the slide clamp, said side portions opposing each other and the other side portion having means thereon for engaging the opposite face of the work piece, and said roller having a shaft extension extending through the slide clamp, said shaft extension having a turning means thereon for effecting the manual rotation of the roller.

6. A slide clamp gripping device comprising a main body having opposing side portions with slide surfaces thereon, one of the side portions having on the slide surface thereof teeth formations, a slide clamp adjustable upon the side portion, a roller journalled in the slide clamp and having teeth formations operable over the teeth formations on the slide surface, said slide surface on the side portion being inclined, means on the opposite side portions for receiving and gripping the work piece along with the action of the slide clamp upon the opposite side portion, and manually operable means extending from the gear roller for effecting the rotation of the roller and the adjustment of the slide clamp along the slide surface of the side portion.

WILLIAM MURRAY.

REFERENCES CITED

The following references are of record in the file of this patent:

UNITED STATES PATENTS

| Number | Name | Date |
| --- | --- | --- |
| 644,633 | Penticoff | Mar. 6, 1900 |
| 1,121,130 | Rafferty | Dec. 15, 1914 |
| 2,387,408 | Pertuit | Oct. 23, 1945 |